Jan. 12, 1965  D. B. PALL ETAL  3,165,473
CORRUGATED FILTER UNIT

Filed Oct. 24, 1960  2 Sheets—Sheet 1

Jan. 12, 1965   D. B. PALL ET AL   3,165,473
CORRUGATED FILTER UNIT
Filed Oct. 24, 1960   2 Sheets-Sheet 2

3,165,473
CORRUGATED FILTER UNIT
David B. Pall, Roslyn Heights, Marcel G. Verrando, Jr., Glen Cove, and Bernard Silverwater, Westbury, N.Y., assignors to Pall Corporation, Glen Cove, N.Y., a corporation of New York
Filed Oct. 24, 1960, Ser. No. 64,346
12 Claims. (Cl. 210—510)

This invention relates to corrugated foraminous metallic material resistant to distortion in use, and, more particularly, to corrugated metallic filter elements having a metallic cross-strip bonded thereto in a manner to prevent distortion of the filter in use.

Corrugated filter elements which are designed for use in high pressure fluid systems must, of necessity, possess sufficient strength to withstand the fluid pressure to which they are subjected during use. As the contaminants accumulate upon the element, the differential pressure resulting from such accumulation increases, causing the corrugations to become distorted or collapse, reducing the contaminant capacity of the filter element by 25% or more, and requiring that the element be replaced prematurely. This problem is particularly acute when the filter element is made of a very fine mesh or other structurally weak material.

A corrugated mesh filter element of fine wires can be strengthened by interposing a coarser mesh material of heavy wires between or upon the mesh of finer wires. Wires of larger diameter can also be interwoven with the finer wires. Both these expedients reduce the open pore area, and thus to a certain extent are self-defeating because reduction in pore area increases pressure drop across the filter, and a lower contaminant capacity results as well. The problem is to provide a sufficient resistance to distortion without reducing porosity, or increasing the pressure drop across the filter, or reducing contaminant capacity.

In accordance with the present invention, there is provided a corrugated metallic filter element having superior resistance to distortion, a high contaminant capacity, and a substantially undiminished open pore area, comprising a corrugated foraminous metallic material having a metallic cross-strip bonded thereto in a manner to prevent distortion of said material under the conditions to which it is subjected in use.

The invention is applicable to any foraminous metallic material which has a tendency to become distorted in use, such as when subjected to high fluid pressures. The foraminous material will be corrugated in sheet or tube form, and will have an open pore area appropriate to the filtration requirements. Perforated sheet materials and woven wire mesh are widely used in filtration, and are particularly suited for strengthening in accordance with the invention. The invention also is applicable to nonwoven sintered, brazed or welded wire sheets made from parallel layers of wires crossing each other at any angle and bonded together in this way to prevent their displacement, as well as to sintered, brazed or welded wire mesh. Sinter-bonded meshes may be rolled or pressed before or after sintering, as described in U.S. Patent No. 2,925,650 to Pall, dated Feb. 23, 1960, or rolled or pressed without sintering, as described in U.S. Patent No. 2,423,547 to Behlen, dated July 8, 1947. Woven wire mesh materials can have any desired weave structure, such as square, twill or Dutch twill weaves. A plurality of layers may be used in close juxtaposition or bonded together by a sintering, welding or brazing operation.

The foraminous metallic material may be formed of any metal, such as, for example, copper, aluminum, iron, silver, steel, nickel, chromium, and metal alloys of various types, such as Monel, Hastelloy C, N–155 alloy, stainless steel, nickel and chromium alloys, ferrous alloys, brass, and bronze.

The choice of metal for the foraminous material and cross strip will to some extent depend upon the corrosion resistance required in the system in which the structure is used. Stainless steel and nickel chromium alloys are preferred because of their superior resistance to corrosion in most systems.

The cross strip, which is of a metal the same as the foraminous material or bondable thereto, is fixed to the foraminous sheet in such a manner as to cross the corrugations thereof. The cross strip may lie at right angles to the corrugations, or at any lesser angle thereto not less than 45° to the normal of the corrugations.

The cross strip should be bonded to substantially all parts of the foraminous sheet. If the foraminous sheet is made up of wires, preferably it is bonded to each wire that it crosses, for maximum strength. A single cross strip may be sufficient to impart the desired resistance to distortion, but if desired, a plurality of cross strips can be used, parallel to each other or at angles to each other, and on the same or opposite sides of the sheet material. In order to minimize the reduction in open pore area of the foraminous material, the smallest number of cross strips needed to give the required distortion resistance is used, and these are as narrow as is permissible for the required resistance to distortion. The width and thickness of the cross strips, and the spacing between adjacent cross strips, will necessarily depend upon the particular distortion resistance requirements of the material.

In most cases, it will be found that one cross strip positioned near the center of the foraminous material, or two cross strips positioned adjacent the edge of the foraminous material, will be sufficient to meet the need.

For ease of manufacture, it is generally preferred to bond the cross strip to the foraminous material before corrugation of the latter. Then, during corrugation, both the cross strip and the foraminous material will acquire the desired configuration simultaneously, and the resistance to distortion imparted by the cross strip will also be obtained automatically in the final structure. However, it is also possible to separately corrugate the metal cross strip and the foraminous material, and bond them together.

The bonding can be effected by any conventional means known to those skilled in this art. Where applicable, sintering is preferred, because an effective bond is thereby obtained by simple application of sufficient heat and pressure to hold the two materials in contact. Furthermore, the resulting bond keeps to a minimum reduction in open pore area and pore diameter, due to flow of metal at the bond. Nonetheless, it is also possible to employ any known welding, brazing or soldering technique, the latter being particularly applicable where copper, aluminum, brass and bronze materials are employed. Sintering is preferred in the case of stainless steel.

It is also possible to form the metallic cross strip and all or part of the foraminous material of magnetic material, such as is described, for example, in U.S. Patent No. 2,490,635 to Kisch, and in French Patent No. 1,214,348 to Pall. Such expedients are well known to those skilled in this art, and need not be described here in greater detail.

The various stages in the preparation of a filter element incorporating a foraminous metallic material and cross strip in accordance with the invention are illustrated in the drawing, in which.

Figure 1:
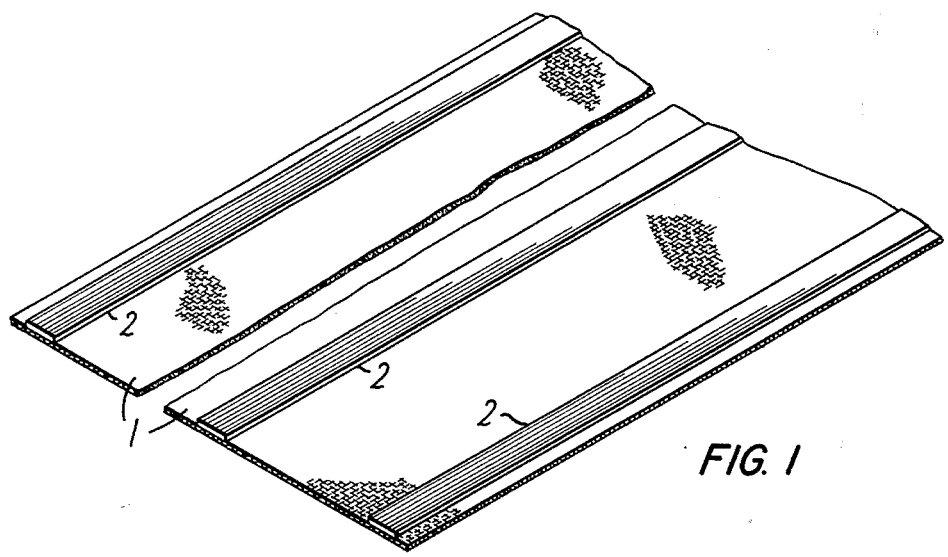
FIGURE 1 is a fragmentary view in perspective of a foraminous metallic material having a cross strip bonded thereto and ready for corrugation to form a filter element.
Figure 2:
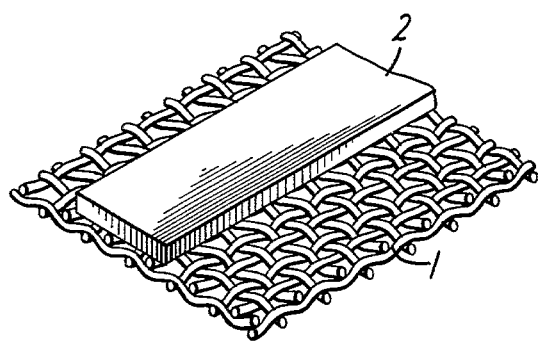
FIGURE 2 is an enlarged fragmentary view of the foraminous metallic material of FIGURE 1, showing how the cross strip is bonded to the material.

To a foraminous metal sheet 1, best shown in FIGURE 1, is bonded, such as by sintering, three metallic cross strips 2. In this instance, the foraminous material and the cross strips are formed of stainless steel wire mesh and are bonded together by sintering, as shown in FIGURE 2. The bonding does not result in appreciable flow of the metal at the junction points, and the overall open pore area of the sheet is only very slightly reduced, because of the narrowness of the cross strips.

The cross strips are parallel to each other, and two are adjacent the edges and one at the center of the foraminous sheet material. If desired, additional cross strips could be applied on the opposite side of the sheet, backing up each cross strip shown.

Figure 3:
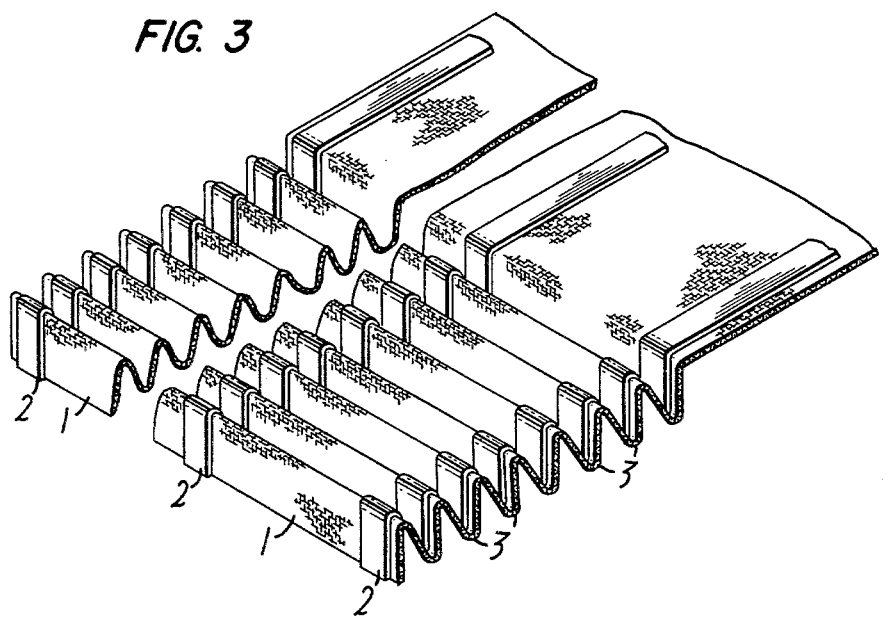
FIGURE 3 is a fragmentary view in perspective of the foraminous metallic material of FIGURE 1, after corrugation, and ready for use in sheet form as a filter element.
Figure 4:
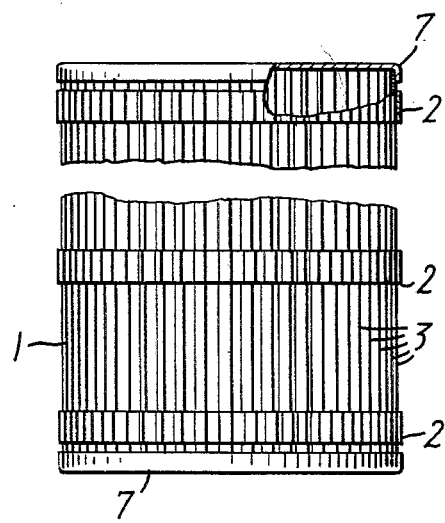
FIGURE 4 is a view of the foraminous metallic material folded in the form of a tube, thus forming a cylindrical corrugated filter element.

Next, the foraminous sheet is corrugated, and simultaneously the metal strips also are corrugated, producing the structure shown in FIGURE 3. A plurality of corrugations 3 perpendicular to the longitudinal axis of the foraminous material and the cross strips are thus introduced in this way. This corrugated sheet is then formed into a tube, in which the corrugations are evenly spaced, forming a cylindrical corrugated filter element with a considerably greater surface area confinable in a given volume than would be obtained without the corrugations. This corrugated cylinder can be held in a cylindrical form, as shown, by the end caps 7, which can also be of stainless steel, and which can be sinter-bonded to the periphery of the cylinder, if desired.

It will, of course, be apparent that the corrugated structure of FIGURE 3 need not be put in cylindrical form, but could be employed in corrugated sheet form, as shown, or formed into any other type of structure, as required by the particular filter unit in connection with which it is to be used.

We claim:

1. A filter element comprising a corrugated foraminous metallic sheet material which has a tendency to become distorted under the conditions to which it is subjected in use, and a relatively narrow metallic cross-strip bonded to a surface thereof and following the corrugated contour of the sheet, in and out of the corrugations thereof in a manner to prevent distortion thereof.

2. A filter element according to claim 1 in which the foraminous metallic material is a wire mesh.

3. A filter element according to claim 1 in which the foraminous metallic material is a sintered wire mesh.

4. A filter element according to claim 1 in which the foraminous metallic material is a rolled and sintered wire mesh.

5. A filter element according to claim 1 which comprises a plurality of layers of foraminous metallic material bonded together.

6. A filter element according to claim 1 in which the foraminous metallic material is a perforated metallic sheet.

7. A filter element in accordance with claim 1 in which the cross-strip is sinter bonded to the foraminous metallic material.

8. A filter element in accordance with claim 1 in which the cross-strip is welded to the foraminous metallic material.

9. A filter element in accordance with claim 1 in which the foraminous metallic material and the cross-strip are made of stainless steel.

10. A filter element comprising a corrugated foraminous metallic sheet material which has a tendency to become distorted under the conditions to which it is subjected in use, having a plurality of relatively narrow metallic cross-strips bonded to a surface thereof and following the corrugated contour of the sheet, in and out of the corrugations thereof in a manner to prevent distortion thereof.

11. A filter element in accordance with claim 10 in which cross-strips are positioned adjacent the edges of the foraminous metallic material.

12. A filter element in accordance with claim 10 in which cross-strips are bonded to each side of the foraminous material.

References Cited in the file of this patent

UNITED STATES PATENTS

| | | |
|---|---|---|
| 2,122,053 | Burkhardt | June 28, 1938 |
| 2,463,825 | Strassheim | Mar. 8, 1949 |
| 2,915,426 | Poelman | Dec. 1, 1959 |
| 2,957,235 | Steinberg | Oct. 25, 1960 |
| 2,979,400 | Mouwen | Apr. 11, 1961 |
| 3,057,481 | Pall | Oct. 9, 1962 |

FOREIGN PATENTS

| | | |
|---|---|---|
| 1,059,010 | France | Nov. 10, 1953 |
| 497,020 | Great Britain | Dec. 12, 1938 |

OTHER REFERENCES

"Materials and Methods," vol. 41, pp. 98–101, April 1955, J. B. Campbell.